UNITED STATES PATENT OFFICE.

CHARLES B. JACOBS, OF PORT CHESTER, NEW YORK, ASSIGNOR TO MURRAY AND JACOBS MANUFACTURING COMPANY, OF NEW YORK, N. Y., A CORPORATION OF NEW YORK.

SAND MOLD AND METHOD OF TREATING THE SAME.

1,153,230.  Specification of Letters Patent.  Patented Sept. 14, 1915.

No Drawing. Application filed January 4, 1912, Serial No. 669,491. Renewed July 24, 1915. Serial No. 41,796.

*To all whom it may concern:*

Be it known that I, CHARLES B. JACOBS, a citizen of the United States, and a resident of Port Chester, Westchester county, State of New York, have invented certain new and useful Improvements in Sand Molds and Methods of Treating the Same, of which the following is a specification.

This invention relates to the production of sand molds for making metal castings; and it has for an object the production of mold surfaces, particularly molds formed of unbaked or "green" sand which are adapted for forming those kinds of steel and other castings which ordinarily cannot be satisfactorily made in such molds because of the delicacy of the mold surface or some part thereof or because of the weight or erosive character of the metal or its tendency to flux with the material in the mold and form scabs or scoria or an objectionable crust on the surface of the casting.

In accordance with this invention, a cement is applied (that is, to the whole of, or a part of, the surface) of a sand mold and dried, said cement being adapted, when solidified, to make the surface of the mold hard and strong so that it will not disintegrate or be deformed by the eroding action of the metal flowing therethrough or by the weight of the metal, and will not unite with the metal so as to form scabs or scoria.

In carrying out the invention, the mold may be formed in the ordinary way, and the surface of those parts of the mold which require strengthening are treated with the cement which may be applied as a wash by means of a mold swab or it may be sprayed upon the surface of the mold by means of an atomizer or spray can. When the surface of the mold has thus been moistened with the cement, it is dried to solidify the cement. This is preferably effected in the case of green sand molds with a torch, such as is used in foundries for skin drying purposes or whether the surface be of green or core sand, the drying operation may be effected by baking or allowing the mold to stand in the air a sufficient length of time.

The cement which has given the best results is what is herein termed a "soluble glass". Such a cement may be formed by combining the oxids of certain elements of groups three and four of the periodic table with the oxygen salts of the alkalin metals. For example, oxids of silicon or boron combined with the hydrate, carbonate or sulfate of sodium or potassium in various proportions will produce suitable cements, instances of those having silicon as the base being the substances commonly known as "waterglass". An instance of such a cement having boron as the base is what may be termed a "soluble boric acid glass". This may be formed, for example, by digesting with an equivalent quantity of water, three or four molecular equivalents of boric anhydrid with one molecular equivalent of sodium hydrate or one molecular equivalent of potassium hydrate. As an instance, take 65 to 85 parts (by weight) of boric anhydrid, 40 parts of caustic soda, and 105 to 125 parts of water, and digest these with heat. The result will be a viscous liquid soluble in water and similar in many of its properties to ordinary water glass.

The strength of the cement may be varied according to varying conditions and according to the result desired. For instance, ordinarily, it will require a stronger solution of the soluble glass to produce a given degree of hardness in the mold surface with coarse sand than with fine sand, and, other conditions being equal, the stronger the solution, the harder the surface produced. It should be observed, however, that, if the solution is too strong or of full strength, it will be too viscous and will not readily penetrate the surface of the mold and the drying process may produce blisters. On the other hand, if the solution is very weak, the hardening effect will be correspondingly lessened. Ordinarily, the best results will be produced with a solution having from one to four parts of water to one part of the full strength solution.

Advantages of the invention other than those herein mentioned or suggested will be obvious to those skilled in the art.

It will be understood that the invention in its broader aspects is not limited to the particular sustances herein specifically described nor to the use of a simple solution of soluble glass as, if desired, various mold facings, such, for instance, as powdered graphite, silica, lamp black, or the like, may be mixed therewith or subsequently applied to the hardened surfaces to give the desired character of finish to the castings, and other changes or expedients may be resorted to without departing from the main principles of the invention and without sacrificing its chief advantages.

I claim:

1. The method of treating sand molds, which method consists in applying to the sand surface of the mold a liquid cement adapted to penetrate into the mold sand and to consolidate and harden the surface thereof, and then drying such surface; whereby the sand mold is rendered able to resist disintegration, deformation, erosion or chemical action by the molten metal.

2. The method of treating sand molds, which method consists in applying to the sand surface of the mold a cement adapted to penetrate the mold sand and harden the surface thereof, and then drying such surface; whereby the sand mold is rendered able to resist injury from the molten metal.

3. The method of treating sand molds, which method consists in applying to the sand surface of the mold a soluble glass cement adapted to penetrate the mold sand and harden the surface thereof, and then drying such surface; whereby the sand mold is rendered able to resist injury from the molten metal.

4. The method of treating sand molds, which method consists in applying to the sand surface of the mold a solution of water glass adapted to harden the surface thereof, and then drying such surface; whereby the sand mold is rendered able to resist injury from the molten metal.

5. The method of treating sand molds, which method consists in applying to the sand surface of the mold a liquiform cement comprising a cementing liquid holding in suspension finely divided solid material, such cement adapted to penetrate into the mold sand and harden the surface thereof, and then drying such surface; whereby the sand mold is rendered able to resist injury from the molten metal.

6. The method of treating sand molds, which method consists in applying to the sand surface of the mold a liquiform cement comprising a soluble glass holding in suspension finely divided solid material, such cement adapted to penetrate into the mold sand and harden the surface thereof, and then drying such surface; whereby the sand mold is rendered able to resist injury from the molten metal.

7. A sand mold having a surface portion thereof consisting of sand cemented and hardened by a solidified soluble glass.

8. A sand mold having a surface portion thereof consisting of sand cemented and hardened by a solidified water glass.

9. A sand mold having a surface portion thereof consisting of sand cemented and hardened by a solidified soluble glass having incorporated therein a material more finely divided than the mold sand.

In testimony whereof, I have signed my name to this specification, in the presence of two subscribing witnesses.

CHARLES B. JACOBS.

Witnesses:
R. R. MURPHY,
WM. J. DOLAN.